United States Patent
Kobayashi et al.

(10) Patent No.: US 6,929,463 B2
(45) Date of Patent: Aug. 16, 2005

(54) ROTARY TRANSFER DEVICE IN BLOW MOLDING MACHINE

(75) Inventors: Sentaro Kobayashi, Nagano-ken (JP); Naohide Matsuzaka, Nagano-ken (JP)

(73) Assignee: A. K. Technical Laboratory, Inc., Nagano-ken (JP)

( * ) Notice: Subject to any disclaimer, the term of this patent is extended or adjusted under 35 U.S.C. 154(b) by 210 days.

(21) Appl. No.: 10/380,937

(22) PCT Filed: Sep. 27, 2001

(86) PCT No.: PCT/JP01/08467

§ 371 (c)(1),
(2), (4) Date: Mar. 19, 2003

(87) PCT Pub. No.: WO02/28620

PCT Pub. Date: Apr. 11, 2002

(65) Prior Publication Data

US 2004/0028770 A1 Feb. 12, 2004

(30) Foreign Application Priority Data

Sep. 29, 2000 (JP) .................................. 2000-301049

(51) Int. Cl.[7] ............................................. B29C 49/36
(52) U.S. Cl. .................................... 425/534; 425/540
(58) Field of Search ............................. 425/529, 533, 425/534, 540

(56) References Cited

U.S. PATENT DOCUMENTS

| 4,105,391 A | | 8/1978 | Aoki | 425/540 |
|---|---|---|---|---|
| 4,336,470 A | | 6/1982 | Gutris | 310/42 |
| 4,422,843 A | * | 12/1983 | Aoki | 425/525 |
| 4,457,689 A | * | 7/1984 | Aoki | 425/525 |
| 4,648,824 A | | 3/1987 | Aoki | 425/529 |
| 4,747,769 A | | 5/1988 | Nakamura et al. | 425/529 |
| 4,846,661 A | * | 7/1989 | Nakamura et al. | 425/522 |
| 5,062,787 A | * | 11/1991 | Takeuchi | 425/522 |

FOREIGN PATENT DOCUMENTS

| EP | 0 328 658 | 8/1989 |
|---|---|---|
| EP | 426096 A2 | 5/1991 |
| JP | 9-84325 A | 3/1997 |
| TW | 398410 | 7/2000 |

OTHER PUBLICATIONS

Fischer, Rolf. "Elektrische Maschinen" 1995, Carl Hanser Verlag, München, Wien, p. 14, paragraphs 4–8.

* cited by examiner

*Primary Examiner*—Robert B. Davis
(74) *Attorney, Agent, or Firm*—Weingarten, Schurgin Gagnebin & Lebovici LLP

(57) ABSTRACT

To realize direct and intermittent rotation of a transfer member by directly coupling the rotary part of a servo motor with a rotary shaft. A supporting board is arranged side by side with working space 3 made vacant above a machine base. The center part of a transfer member arranged on the undersurface of a supporting board 4 is coupled with a rotary shaft 7 of a relatively large diameter inserted through the center of the supporting board and mounted on a bearing. The servo motor 8 provided with the fixing part 8b inside of the rotary part 8a of the large diameter in the center of the supporting board 4 is attached to a supporting base 15 erected on the supporting board 4 via a joint 18 on the side of the fixing part 8b. The rotary part 8a is mounted on the top of the rotary shaft 7, and thereby the transfer member 6 is constructed so as to be directly rotated with the rotary shaft 7 by the servo motor 8.

1 Claim, 2 Drawing Sheets

ROTARY TRANSFER DEVICE IN BLOW MOLDING MACHINE

BACKGROUND OF THE INVENTION

1. Field of the Invention

The present invention relates to a rotary transfer system of a blow molding machine to be used for molding a container for packaging such as a bottle.

2. Detailed Description of the Prior Art

On a molding machine for intermittently transferring an injection-molded preform up to a stretch-blowing position by holding a mouth part or the like, a hydraulically operated actuator has conventionally been used as a rotary drive source.

An actuator driven by a hydraulic drive source has had such problems as it needs piping, valves, or the like; it has had restriction in the operation because the hydraulic source is commonly used as other drive sources; further, oil leakage may occur; and it has taken time also for maintenance and control as a result.

For the above reasons, it is considered to use an electric servo motor (hereafter, called servo motor) as it is, which is adopted for use in an insert molding machine, and to perform rotary transfer of the transfer member of the rotary board, however, the transfer member is supported on the supporting board above the machine base so as to freely rotate and a plurality of metal molds are attached to the undersurface of the transfer member, in the case of the blow molding machine, therefore, differing from the case of the insert molding machine which rotatively transfers a rotary disc supported by the machine base from underneath, the weight of the transfer member is apt to be concentrated on the rotary shaft and has also large inertia, therefore, a rotational torque larger than ever is required for intermittently rotating the transfer member smoothly, and a rotary transfer device with a larger torque is required as a result.

Moreover, although it is easily possible to increase an output torque by means of a variable-speed gear, it is very difficult to further secure an installation space for the variable-speed gear in the case of a small and middle type of a molding machine, while it is easy in the case of a large type of a molding machine though. For this reason, it has been desired to develop a rotary transfer device with a large torque eliminating the need for the variable-speed gear.

The present invention is devised from the above-described situation, and the purpose thereof is to provide a rotary transfer device with a rotary transfer device of a new structure capable of intermittently rotating the transfer member directly by the servo motor.

SUMMARY OF THE INVENTION

The present invention for the above purpose is constituted such that the supporting board is arranged side by side with working space formed vacant above a machine base, and the center portion of the transfer member mounted on an undersurface of the supporting board is coupled with a rotary shaft of a relatively large diameter inserted through the center of the supporting board to support on a bearing, while the servo motor provided with a fixing part or stator inside of the rotary part of a relatively large diameter in the center portion on the supporting board is mounted on a supporting base erected on the supporting base via a joint on the side of the fixing part thereof, and the rotary part is mounted on the top of the above-mentioned rotary shaft, thereby the above-mentioned transfer member is constructed so as to be directly rotated with the rotary shaft by the above-mentioned servo motor.

DETAILED DESCRIPTION OF THE PREFERRED EMBODIMENT

Figure 1:
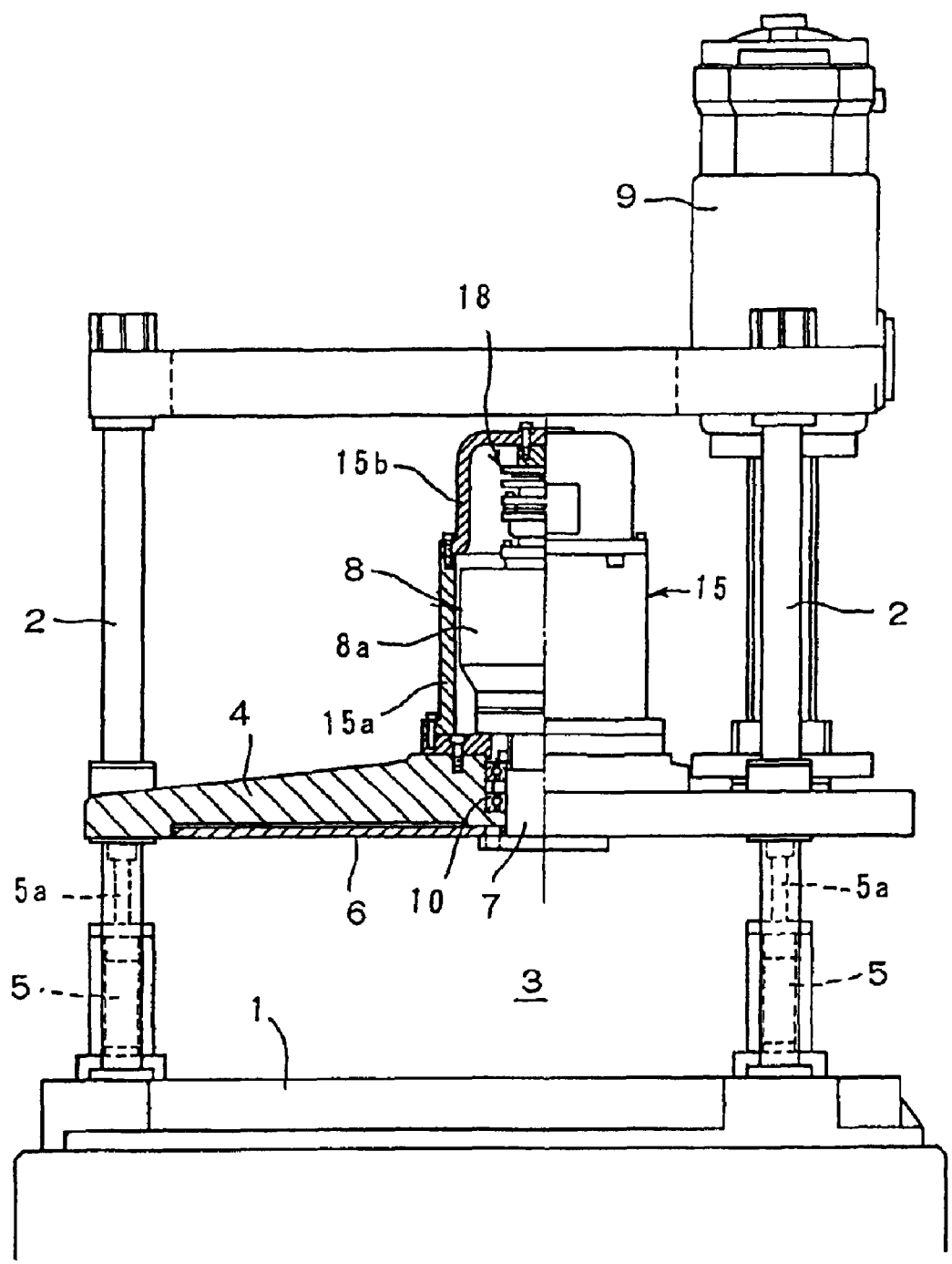
FIG. 1 A front view showing a schematic diagram of a molding machine provided with a rotary transfer device in accordance with the present invention.
Figure 2:
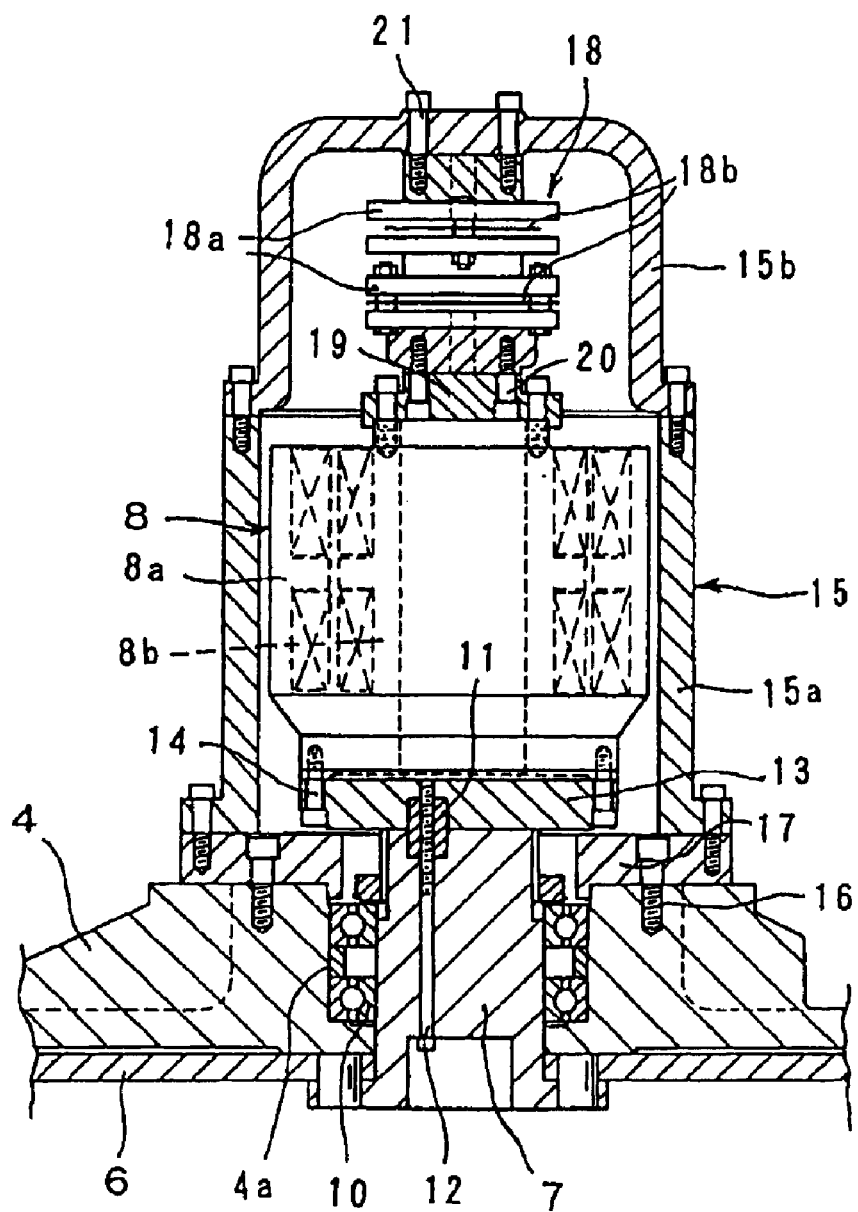
FIG. 2 A vertical sectional view of a rotary transfer device relating to the present invention.

In the figure, the base board fixedly mounted on the machine base is shown by the mark 1, and the supporting board 4 is arranged side by side with the working space 3 formed vacant so as to be freely movable up and down by putting there-through a plurality of guide shafts 2, 2 erected at the corners of the machine base. This supporting board 4 is connected with piston rods 5a, 5a of open/close cylinders 5, 5 erected at the necessary points on the base board 1.

On the undersurface for the above-mentioned supporting board 4 faced to the working space 3, the center part of the transfer member 6 comprised of a rotary disc is integrally connected into one body with the bottom end part of the rotary shaft 7 of a relatively large diameter penetrating through the center part of the supporting board 4, and is mounted so as to be rotated with the rotary shaft 7. The rotary driving servo motor 8 is installed on the upper surface in the center of the supporting board 4.

In the above-mentioned working space 3, an injection metal molding device and a stretch-blowing molding device or the like, which are not shown in the figure though, are to be arranged when the molding machine is used for injection stretch-blowing, and on the supporting board 4 corresponding to those devices, a mold fastening device 9 and a stretch-molding device (omitted in the figure) are to be arranged as those in an ordinary case, and on the undersurface of the transfer member 6, a required number of preforms and transfer metal molds of products (omitted in the figure) are to be arranged as well.

The above-mentioned servo motor 8 is provided with a stator or fixing part 8b inside of the rotor part 8a with a large diameter; the fixing part 8b is attached to the side of the supporting base; and the rotary part 8a is directly mounted on the top end of the above-mentioned rotary shaft 7, so that the rotary part 8a and the above-mentioned transfer member 6 may directly be rotated with the above-mentioned rotary shaft 7 which is supported on a ball bearing 10 and put through the hole part 4a at the center of the supporting board so as to be freely rotatable.

The mounting of the above-mentioned rotary part 8a on the rotary shaft 7 is carried out by mounting the servo motor 8 on a bearing plate 13 mounted on the top end of the rotary shaft 7 and fixed on the rotary shaft 7 by a hollow pin 11 and a bolt 12, abutting the bottom end of the rotary part 8a thereon, and fixing the bottom end on the bearing plate 13 by the bolts 14.

Moreover, the mounting of the above-mentioned fixing part 8b onto the supporting board 4 is carried out with the servomotor 8 housed in the supporting base 15 erected on the peripheral upper surface of the above-mentioned hole part 4a. This supporting base 15 is comprised of a cylindrical base part 15a of a diameter larger than the servo motor 8 and a cap-shaped ceiling part 15b arranged to cap the upper part of the base part 15a, and the mounting is performed by erecting the base part 15a on a ring-form bearing plate 17 fixedly arranged on the supporting board 4 by the bolts 16, building the servomotor 8, which is coupled with a mount 19 on the top end of the fixing part 8a by the bolts 20 beforehand, in the base part 15a and then putting the ceiling part 15b on the upper part of the base part 15a to be fixed on by the bolts 21, and then connecting a joint 18 made up of multiple plates 18a with inserted spring washers 18b to the ceiling part 15b by the bolts 20.

In a molding machine provided with such a servo motor 8 as a rotary drive source, it is possible to control rotation angles of the rotary part 8a with high accuracy and is also easy to control angular velocity, therefore, for example, in the case of an injection stretching blow molding machine, it is possible to exactly repeat rotation and stop of the transfer member 6 at the angles of 90°, 120°, and 180°.

Moreover, since the rotary part 8a of the servo motor 8 is directly coupled with the rotor shaft 7 coupled with the transfer member 6, it is possible to directly rotate the transfer member 6 by the servo motor 8 intermittently, and the intermittent rotation of the transfer member 6 can be performed with a torque larger than ever thanks to the large diameter of the rotary part 8a.

The servo motor has been adopted as a rotary drive source firstly for such reasons as described above, but in addition to the above results, the adoption of the servo motor eliminates the need for a variable-speed gear and makes the structure simpler than a conventional device, and the molding machine is not only decreased in power consumption but also increased in speed, and is further enhanced in maintainability.

Moreover, in the embodiment illustrated in the figures, the supporting board 4 is moved up and down by open/close cylinders 5 along the guide shafts 2, however, tie bars instead of the guide shafts 2 may fix the supporting board 4.

Also, the transfer member 6 is not restricted to a rotary disc but any member having a rotation center is applicable irrespective of a shape of the transfer member.

What is claimed is:

1. A rotary transfer device in a blow molding machine comprising;

a base board mounted on a machine base, and a supporting board disposed above the base board side by side with a working space between the base board and the supporting board, the supporting board having a hole part disposed therethrough at the center;

a transfer member disposed on an undersurface of the support board facing the working space;

a driving apparatus disposed on. an upper surface of the supporting board, the driving apparatus comprising a servo motor comprising a rotary part connected to a rotary shaft, the rotary shaft inserted through the center of the supporting board, and a stator fixed inside of the rotary part, the rotary part having a large diameter;

the transfer member integrally connected to a bottom end of the rotary shaft to be rotated with the rotary shaft;

the servo motor housed in a supporting base comprising a cylindrical base part and a ceiling part, the cylindrical base part disposed on a peripheral upper surface of the hole part of the supporting board;

the servo motor mounted on the supporting board by connecting the stator to the ceiling part by a joint;

the rotary part of the servo motor directly mounted on the top end of the rotary shaft supported on a bearing through the hole part at the center of the supporting board; and the transfer member rotatable directly by the rotary part of the servo motor.

* * * * *